(12) United States Patent
Rose

(10) Patent No.: US 12,468,284 B2
(45) Date of Patent: Nov. 11, 2025

(54) 3D AXIS MACHINING DESIGN

(71) Applicant: DASSAULT SYSTEMES, Vélizy-Villacoublay (FR)

(72) Inventor: Thibault Dominique Marie Bernard Rose, Vélizy-Villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 422 days.

(21) Appl. No.: 18/072,455

(22) Filed: Nov. 30, 2022

(65) Prior Publication Data

US 2023/0185275 A1 Jun. 15, 2023

(30) Foreign Application Priority Data

Dec. 13, 2021 (EP) .................................... 21306754

(51) Int. Cl.
*G05B 19/4097* (2006.01)
*B23Q 15/12* (2006.01)

(52) U.S. Cl.
CPC ......... *G05B 19/4097* (2013.01); *B23Q 15/12* (2013.01); *G05B 2219/35134* (2013.01)

(58) Field of Classification Search
CPC ...... G05B 19/4097; G05B 2219/35134; G05B 19/4099; B23Q 15/12; G06F 2119/18; G06F 30/23; G06F 30/20; G06F 30/17; G06T 2219/2021; G06T 19/20; G06T 17/20

See application file for complete search history.

(56) References Cited

U.S. PATENT DOCUMENTS

| | | | | |
|---|---|---|---|---|
| 5,351,196 A | * | 9/1994 | Sowar | ................ G05B 19/4097 700/98 |
| 6,606,528 B1 | * | 8/2003 | Hagmeier | .......... G05B 19/4097 700/98 |
| 8,280,698 B2 | | 10/2012 | Montana et al. | |
| 2010/0286812 A1 | * | 11/2010 | Slettemoen | .......... G01B 21/045 700/173 |

OTHER PUBLICATIONS

Extended European Search Report issued May 25, 2022 in European Patent Application No. 21306754.9 filed Dec. 13, 2021.

(Continued)

*Primary Examiner* — Chad G Erdman
(74) *Attorney, Agent, or Firm* — Oblon, McClelland, Maier & Neustadt, L.L.P.

(57) ABSTRACT

The disclosure notably relates to a computer-implemented method for 3D axis machining design. The method comprises providing a first mesh. The first mesh represents a head of a machining tool. The method comprises providing a second mesh. The second mesh represents a machined part. The first mesh is closed. The method further comprises determining a boundary of a Minkowski subtraction of the surface represented by the second mesh by the volume delimited by the first mesh. The determining of the boundary includes computing the boundary as a polyhedral cycle by computing, for each element of the boundary, a multiplicity of the element in the polyhedral cycle. The method further comprises determining a path of the machining tool for 3D axis machining of the machined part based on the determined boundary. This constitutes an improves solution for 3D axis machining design.

20 Claims, 6 Drawing Sheets

(56) References Cited

OTHER PUBLICATIONS

Montana, N., "Calcul robuste d'enveloppe de solides en mouvement. Application à la simulation de l'enlèvement de matière en usinage", PhD Thesis, May 27, 2013, 191 total pages.
Chazal, F., et al., "Discrete Critical Values: A General Framework for Silhouettes Computation", Eurographics Symposium on Geometry Processing, vol. 28, No. 5, 2009, pp. 1509-1518.
CGAL User manual—2D Minkowski Sums Reference, 2022, pp. 1-8.
Cox, W., et al., "A Review of Methods to Compute Minkowski Operations for Geometric Overlap Detection", IEEE Transactions on Visualization and Computer Graphics, IEEE, USA, vol. 27, No. 8, 2021, pp. 3377-3396.
Bock, A, "Minkowski Sums and Offsets of Polygons Seminar Computational Geometry and Geometric Computing", Jan. 1, 2010 (Jan. 1, 2010), XP055922076, Retrieved from the Internet: URL:https//web.archive.org/web/20210422210218if_/https://resources.mpi-inf.mpg.de/departments/dl/teaching/ssl0/Seminar_CGGC/Slides/07_Bock_MS.pdf, pp. 1-62.
Zhiyang, Y., et al., "Cutter path generation for 2.5D milling by combining multiple different cutter path patterns", International Journal of Production Research., vol. 42, No. 11, Jun. 1, 2004 (Jun. 1, 2004), XP055851881, GB ISSN: 0020-7543, DOI: 10.1080/00207540310001652879 Retrieved from the Internet: URL:https://terpconnect.umd.edu/-skoupta/Publication/IJPR04_Yao.pdf, pp. 2141-2161.

\* cited by examiner

3D AXIS MACHINING DESIGN

CROSS REFERENCE TO RELATED APPLICATIONS

This application claims priority under 35 U.S.C. § 119 or 365 to European Application No. 21306754.9, filed Dec. 13, 2021. The entire contents of the above application are incorporated herein by reference.

TECHNICAL FIELD

The disclosure relates to the field of computer programs and systems, and more specifically to a method, system, and program for 3D axis machining design.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production, and service.

A known solution for manufacturing parts is 3D axis machining.

However, there is still a need for an improved method for 3D axis machining design.

SUMMARY

It is therefore provided a computer-implemented method for 3D axis machining design. The method comprises providing a first mesh. The first mesh represents a head of a machining tool. The method comprises providing a second mesh. The second mesh represents a machined part. The first mesh is closed. The method further comprises determining a boundary of a Minkowski subtraction of the surface represented by the second mesh by the volume delimited by the first mesh. The determining of the boundary includes computing the boundary as a polyhedral cycle by computing, for each element of the boundary, a multiplicity of the element in the polyhedral cycle. The method further comprises determining a path of the machining tool for 3D axis machining of the machined part based on the determined boundary.

The method may comprise one or more of the following:
the first mesh is a surface mesh and the second mesh is a surface mesh;
the first mesh is a triangle surface mesh and the second mesh is a triangle surface mesh;
the polyhedral cycle is a sum of elements of the Minkowski subtraction, the elements in the sum including:
  first subtractions each of an edge of the second mesh by an edge of the first mesh;
  second subtractions each of a vertex of the second mesh by a face of the first mesh;
  third subtractions each of a face of the second mesh by a vertex of the first mesh,
each element in the sum being weighted by its determined multiplicity;
the computing of the boundary as the polyhedral cycle includes:
  for each first subtraction, computing the multiplicity of the subtraction;
  computing the multiplicities of the second subtractions and third subtractions by propagating the computed multiplicities of the first subtractions, the propagation being based on the property that the boundary of a polyhedral cycle is zero;
if the second mesh is open, the propagation includes propagating the computed multiplicities of the first subtractions from first subtractions involving boundary edges;
if the second mesh is closed, the propagation includes, for each second or third subtraction:
  computing a first multiplicity value of the subtraction and a second multiplicity value of the subtraction, the second multiplicity value being the absolute value of the first multiplicity value;
  computing the multiplicity of the subtraction as a mean of the first multiplicity value and of the second multiplicity value;
the computing of the first multiplicity value and the second multiplicity value comprises:
  providing an initial value for the first multiplicity value;
  providing a corrective term that equals zero;
  for each respective face having an edge in common with the face involved in said each second or third subtraction:
    propagating, using computed multiplicities of first subtractions, the first multiplicity value and the second multiplicity value to the corresponding subtraction that involves said respective face and the vertex involved in said second or third subtraction;
    updating the corrective term if a difference between the first multiplicity value for said corresponding subtraction and the corrective term is larger than the second multiplicity value for said corresponding subtraction, the updating including attributing to the corrective term a value of a difference between the first multiplicity value for said corresponding subtraction and the second multiplicity value for said corresponding subtraction;
  subtracting the corrective term from the initial value of the first multiplicity;

the method comprises, prior to the computing of the multiplicities for the first subtractions, filtering the first subtractions having a zero multiplicity by using a gaussian map;
the polyhedral cycle is of the type:

$$\sum_i \sum_j \omega(v_1^i, t_2^j) \pi(v_1^i, t_2^j) +$$

$$\sum_i \sum_j \omega(t_1^i, v_2^j) \pi(t_1^i, v_2^j) + \sum_i \sum_j \omega(e_1^i, e_2^j) \pi(e_1^i, e_2^j),$$

where $\pi: V_1 \times S_2 \to \mathbb{R}^3$ $(x_1, x_2) \to x_2 - x_1'$ and where:
S$_2$ is the second mesh and V$_1$ is the volume delimited by the first mesh,
the image of π is the Minkowski subtraction of S$_2$ by V$_1$,
the elements are sum over the subtractions $\pi(v_1, t_2)$, $\pi(t_1, v_2)$ and $\pi(e_1, e_2)$ where v, e and t are respectively the vertices, the edges and the faces of the meshes;
the polyhedral cycle is a boundary of the polyhedral chain $p(x) = \chi(\pi^{-1}(x))$, where χ is the Euler characteristic; and/or
the first mesh is non-convex and/or the second mesh is non-convex.

It is further provided a computer program comprising instructions for performing the method.

It is further provided a computer readable storage medium having recorded thereon the computer program.

It is further provided a computer system comprising a processor coupled to a memory, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
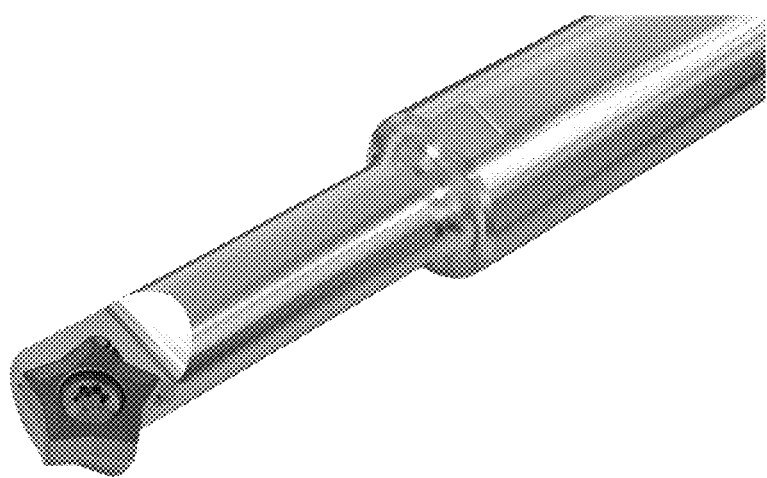
FIGS. 1, 2, 3, 4, 5, 6 and 7 illustrate the method.

It is provided a computer-implemented method for 3D axis machining design. The method comprises providing a first mesh. The first mesh represents a head of a machining tool. The method comprises providing a second mesh. The second mesh represents a machined part. The first mesh is closed. The method further comprises determining a boundary of a Minkowski subtraction of the surface represented by the second mesh by the volume delimited by the first mesh. The determining of the boundary includes computing the boundary as a polyhedral cycle by computing, for each element of the boundary, a multiplicity of the element in the polyhedral cycle. The method further comprises determining a path of the machining tool for 3D axis machining of the machined part based on the determined boundary.

This constitutes an improved solution for 3D axis machining design.

Notably, the method allows to determine a path of a machining tool for 3D axis machining of a machined part based on a Minkowski subtraction of mesh representations of the tool's cutting head and the part. Specifically, the inputs of the method are the provided first mesh, which represents the cutting head of the machining tool, and a second mesh, which represents the machined part. Now, determining the path of the machining tool is determining where and how the tool is to be moved to machine the part. For that, it is known per se from machining that the tool must be moved to cut a solid block of material so as to form the machined part. The movement of the tool for that must be such that the tool's cutting head moves tangentially to the final shape of the machined part, i.e., the shape of the part once machined, i.e., the portion of the material block that is to remain once the machining is done to form the part. To determine the path, the Minkowski subtraction of the surface represented by the second mesh, which represents the outer surface of the machined part (or at least a machined portion thereof), by the volume delimited by the first mesh, which represents the cutting head of the machined tool, is used by the method. This Minkowski subtraction represents the set of points where the cutting head must not be moved in order to obtain a machined part of which shape corresponds to the second mesh. The method determines the boundary of this Minkowski subtraction, which thus corresponds to a surface delimiting a portion of the material block that must not be cut and that corresponds to the shape of the part to machine. The determined boundary thus corresponds to the surface where cutting is to be done to remove the required material so as to form the part. Based on this determined boundary, the method then determines the path of the machining tool for 3D axis machining of the machined part. The method may obtain the path directly from the determined boundary, or, in alternative examples, obtain the path after performing a post-processing of the determined boundary.

The path of the machining tool for 3D axis machining that the method determines is usable in a 3D axis machining process of the machined part. The 3D axis machining process may directly machine the part based on the determined path. For example, the method may output the determined path, e.g., as or in a CAD file, and the machining process then comprises feeding the CAD file to the machining tool and/or programming the machining tool according to the determined path. Alternatively, the machining process may first comprise, before machining, performing a machining simulation based on the determined path to confirm the material removal according to the determined path, and then machining the part according to the determined path if it is confirmed. The method may be included in such a manufacturing process. It is in other words provided a 3D axis machining process for 3D axis machining of a machined part, the process comprising:
providing a block of material and a machining tool, which may include providing specifications (e.g., geometry, dimensions, topology, type and/or parameters) of the block of material and of the machining tool, e.g., to a CAD system that performs the method;
performing the method (e.g., on a CAD system), thereby determining a path of the machining tool for 3D axis machining, the path being a path that the machining tool is to follows when operated so that the block of material is cut to form the machined part represented by the second mesh, where the method outputs the determined path, e.g., as or in a CAD file;
optionally, performing a 3D axis machining simulation (e.g., on a PLM system) based on the determined path (e.g., based on the CAD file) to confirm the path, and optionally re-executing the method and the simulation as long as the determined path is not confirmed. The simulation may take as input a numerical model of the block of material;

optionally, feeding the CAD file to the 3D axis machining tool and/or determining a set-up of the 3D axis machining tool according to the determined path (e.g., as confirmed by the simulation(s)); and 3D axis machining the machined part by moving the 3D axis machining tool along the block of material according to the determined path (e.g., as confirmed by the simulation(s)). This may include launching the tool which then cuts the block of material according to the determined path, e.g., by directly using the fed CAD file (i.e., the machine reads the CAD file and automatically performs the machining according to the determined path) and/or in accordance with the determined set-up.

Figure 2:
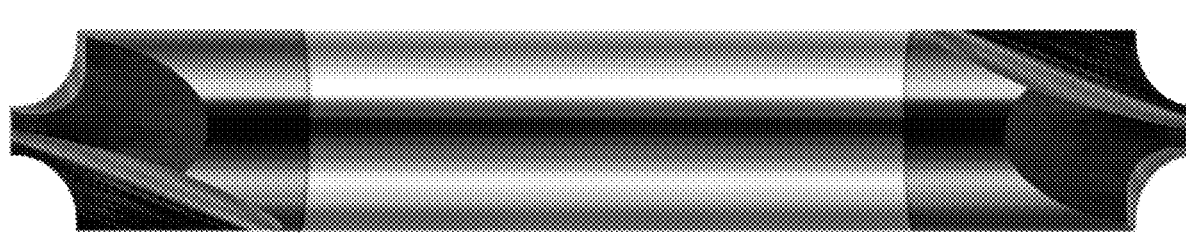

Furthermore, not only does the method provide a path of a machining tool for 3D axis machining of a machined part, but the method does so without any convexity hypothesis on the part or on the tool. For example, the first mesh may be non-convex (e.g., concave) and/or the second mesh may be non-convex (e.g., concave). In examples, the two meshes are non-convex. The method manages to do so by computing the boundary of the Minkowski subtraction as a polyhedral cycle. This computation notably computes the multiplicities of the elements in the polyhedral cycle. This computation of the polyhedral cycle is free of any convexity hypothesis. Being free of any convexity hypothesis allows to consider any industrial case of application, as in practice, machined parts and machining tools may in many cases be non-convex. For example, the head of a machining tool may in many cases by non-convex. FIGS. 1-2 show examples of machining tools having non-convex cutting heads. For example, the cutting head of the machining tool may be concave to allow an improved evacuation of material during machining. Furthermore, even for a tool which is normally convex in the real-world, there may be micro-concavities in the mesh representing the tool, due to numerical artefacts, approximations and/or errors. Moreover, the method does not depend on the meshing accuracy of the first or second mesh, which makes the method robust.

The method is now further discussed.

The method is for 3D axis machining design. 3D axis machining is a method of machining which is well known in the fields of CAD and manufacturing. 3D axis machining design means that the method is a method of manufacturing preparation and/or of manufacturing set up determination, which the method does by outputting a path of a 3D axis machining tool.

The method comprises providing the first mesh and the second mesh. The first mesh and the second mesh are inputs of the method, whereas the determined path is the output.

The first mesh is a mesh representation of the head (i.e., cutting head) of the machining tool. The machining tool is a 3D axis machining tool, which comprises the head, also referred to as "cutting head", which is configured to cut material, and a (non-cutting) holder. The providing of the first mesh may comprise obtaining the first mesh, e.g., from a (e.g., distant) memory where the mesh has been stored further to its creation. Alternatively, the providing of the first mesh may comprise creating the first mesh. Creating the first mesh may comprise providing the cutting head of the machining tool (e.g., by providing the tool) and/or specifications thereof, and then computing the first mesh. Computing the first mesh may comprise performing a 3D reconstruction process from the provided tool. The 3D reconstruction process may comprise obtaining a first point cloud representing the cutting head of the machining tool, for example by scanning the machining tool with one or more sensors and meshing the first point cloud by any suitable meshing method. The first mesh may also stem from a CAD model of the tool (e.g., a B-rep), and optionally the providing of the first mesh may comprise obtaining the first mesh from the CAD model. The first mesh is a closed mesh. The first mesh may be a surface mesh, i.e., meshes a surface that corresponds to the outer surface of the head of the tool. The first mesh may nevertheless be a part of a 3D volume mesh (i.e., a polyhedral model) that meshes a volume that corresponds to the head, the first mesh being in such a case a closed mesh that delimits the volume meshed by the 3D volume mesh. The first mesh has edges, vertices and faces. The first mesh may be a triangle surface mesh, i.e., the faces are triangles. The first mesh may be another type of surface mesh, i.e., with faces which are not all triangles, for examples faces which are convex polygons.

The second mesh is a mesh representation of the machined part. This means that the second mesh represents the whole part or at least a machined portion thereof. A machined part is a part to be manufactured by 3D axis machining. The second mesh represents the machined part once manufactured by 3D axis machining, i.e., represents the final shape of the part, or of a machined portion thereof, i.e., once 3D axis machining is done. In other words, the second mesh represents the shape to give to a raw block of material by 3D axis machining it to form the machined part. The providing of the second mesh may comprise obtaining the second mesh, e.g., from a (e.g., distant) memory where the mesh has been stored further to its creation. Alternatively, the providing of the second mesh may comprise creating the second mesh. This may include designing the machined part, e.g., on a CAD system, in a design process that precedes the method or that the method may comprise as an initial stage. This design process may result in the second mesh or in another CAD model of the part (e.g., a B-rep), and optionally the providing of the second mesh may comprise obtaining the second mesh from the CAD model. The second mesh may be an open mesh, e.g., that represents a portion of the outer surface of the part, or a closed mesh, e.g., that represents the whole outer surface of the part. The second mesh may be a surface mesh, i.e., meshes a surface that corresponds to the outer surface of part or to a portion thereof. The second mesh has edges, vertices and faces. The second mesh may be a triangle surface mesh, i.e., the faces are triangles. The second mesh may be another type of surface mesh, i.e., with faces which are not all triangles, for examples faces which are convex polygons.

Further to the providing of the first and second meshes, the method comprises determining a boundary of a Minkowski subtraction of the surface represented by the second mesh by the volume delimited by the first mesh.

The concepts of Minkowski sum and of Minkowski subtraction are known per se. The Minkowski subtraction of A by B is the Minkowski sum A+(−B), where −B is the symmetric of B with respect to the origin. Here the subtraction is with A the second mesh and B the volume delimited by the first mesh. The first mesh is indeed a closed mesh, and thus delimits a volume and forms the outer surface of this volume. The Minkowski subtraction is mathematically defined as follows:

$$\pi: V_1 \times S_2 \rightarrow \mathbb{R}^3$$

$$(x_1, x_2) \rightarrow x_2 - x_1$$

where $S_2$ is the second mesh and $V_1$ is the volume delimited by the first mesh, and where the image of it is the Minkowski subtraction of $S_2$ by $V_1$. The method thus computes the boundary of the image of Tc. The first mesh may be denoted $S_1$, which is a closed surface mesh bounding the volume $V_1$. $V_1$ may be represented by a polyhedral model. $S_1$ is a 2-manifold having its faces (e.g., triangles) oriented toward the exterior of the bounded volume $V_1$. $S_2$ is a closed or open (i.e., with boundary) surface mesh (polyhedral model) which is a 2-manifold with or without boundary.

The determining of the boundary includes computing the boundary as a polyhedral cycle, by computing, for each element of the boundary, a multiplicity of the element in the polyhedral cycle. The concept of polyhedral cycle is known per se from the field of mathematics. The polyhedral cycle includes elements which belong to the Minkowski subtraction, i.e., which are subtractions each of an element of the second mesh by an element of the first mesh. Each element in the cycle has a multiplicity that represents the oriented contribution of the element in the sum. The method computes these multiplicities.

The method thus computes the boundary of $S_2-V_1$ (the Minkowski subtraction) as a polyhedral cycle. A polyhedral cycle is a set of oriented triangles so that edges appear exactly the same number of times in both orientations. The computed cycle is combinatorial watertight. The polyhedral cycle is a valued sum of oriented faces (e.g., triangles) of the type:

$$\sum_i c_i(V_i^1, V_i^2, V_i^3).$$

Figure 3:
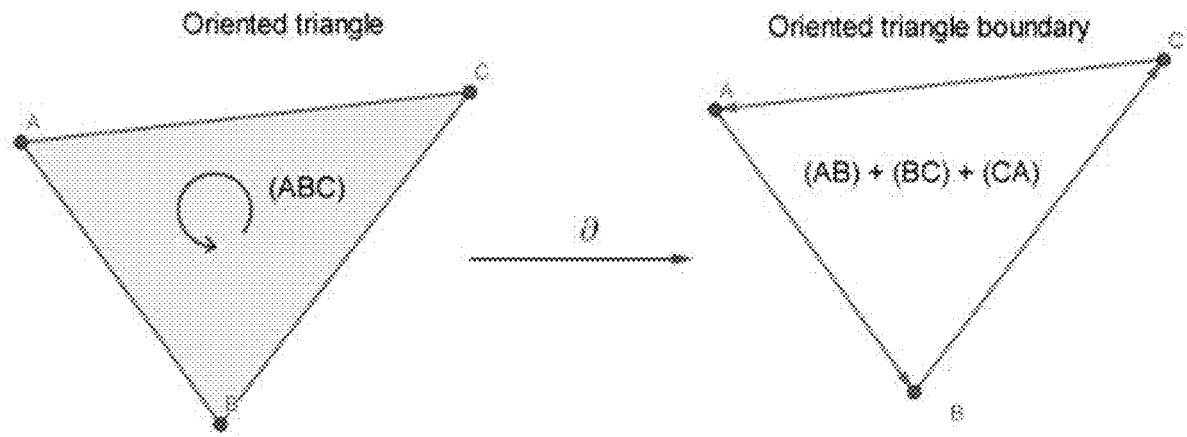

The image of the cycle by the boundary operator, which is called a boundary of the cycle, and which is:

$$\partial: \sum_i c_i(V_i^1, V_i^2, V_i^3) \to \sum_i c_i(V_i^1, V_i^2) + c_i(V_i^2, V_i^3) + c_i(V_i^3, V_i^1)$$

is zero (cycle property). In the valued sum of faces, e.g., triangles, (reps. edges), $(V_i^1, V_i^2, V_i^3) = \varepsilon(\sigma)(V_i^{\sigma(1)}, V_i^{\sigma(2)}, V_i^{\sigma(3)})$ (resp. $(V_i^1, V_i^2) = -(V_i^2, V_i^1)$), where $\sigma$ is a permutation and $\varepsilon(\sigma)$ its signature. The boundary of $S_2-V_1$ is a subset of the support of the polyhedral cycle. The faces are oriented, as illustrated on FIG. 3 which illustrates the orientation of a triangle face. The boundary operator is compatible with an equivalence structure on polyhedral chains.

The polyhedral cycle may be defined by the following formula:

$$\sum_{\substack{t \in \partial V_1 \times S_2 \\ dim(t)=2}} \omega(t)\pi(t).$$

The sum equals:

$$\sum_i \sum_j \omega(v_1^i, t_2^j)\pi(v_1^i, t_2^j) +$$

$$\sum_i \sum_j \omega(t_1^i, v_2^j)\pi(t_1^i, v_2^j) + \sum_i \sum_j \omega(e_1^i, e_2^j)\pi(e_1^i, e_2^j),$$

where the elements are sum over the subtractions $\pi(v_1,t_2)$, $\pi(t_1,v_2)$ and $\pi(e_1,e_2)$ where v, e and t represent respectively the vertices, the edges and the faces (e.g., triangle faces when the meshes are triangle meshes) of the meshes.

The polyhedral cycle of the above formula may be defined as a boundary of the polyhedral chain $$p(x) = \chi(\pi^{-1}(x)),$$

where $\chi$ is the Euler characteristic. The multiplicities $\omega(t)$ for the elements $t \in \partial V_1 \times S_2$ for which $dim(t)=2$ may be defined by the following formula:

$$\omega(t) = \sum_{\substack{t < \tau \\ \pi(\tau) \subset H^-_{\pi(\tau)}}} (-1)^{dim(\tau)-3} - \sum_{\substack{t < \tau \\ \pi(\tau) \subset H^+_{\pi(\tau)}}} (-1)^{dim(\tau)-3}.$$

The above formula for the multiplicities is theoretical but not computed as such by the method, which may compute the multiplicities otherwise, as discussed hereinafter. The above formula holds when $V_1$ is meshed by a volume mesh, so that there is a convex complex that corresponds to $V_1 \times S_2$. The method may however compute the multiplicities otherwise, as discussed hereinafter, in a manner that does not depend on the choice of the volume meshing of $V_1$ and that does not require any convexity hypothesis, so that the method avoids computing a complex for $V_1$ and computes the multiplicities based on the surface mesh that encloses $V_1$, i.e., $S_1$.

The weights thus correspond to the change of values of the function p and the sum $$\sum_i \sum_j \omega(v_1^i, t_2^j)\pi(v_1^i, t_2^j) +$$

$$\sum_i \sum_j \omega(t_1^i, v_2^j)\pi(t_1^i, v_2^j) + \sum_i \sum_j \omega(e_1^i, e_2^j)\pi(e_1^i, e_2^j),$$

represents the equivalence class of the boundary $\partial p$.

In examples, the polyhedral cycle is a sum of elements of the Minkowski subtraction, and the elements in the sum include:
- first subtractions each of an edge of the second mesh by an edge of the first mesh;
- second subtractions each of a vertex of the second mesh by a face of the first mesh; and
- third subtractions each of a face of the second mesh by a vertex of the first mesh, where each element in the sum is weighted by its determined multiplicity. The faces are triangle faces when the meshes are triangle meshes. Alternatively, the faces may be other types of faces (i.e., when the meshes are not triangle meshes), for example formed by convex polygons. The method may use the hypothesis that the first, second, and third subtractions are not degenerate. The method may apply a Simulation of Simplicity method to enforce this hypothesis. In the sum $$\sum_i \sum_j \omega(v_1^i, t_2^j)\pi(v_1^i, t_2^j) +$$

$$\sum_i \sum_j \omega(t_1^i, v_2^j)\pi(t_1^i, v_2^j) + \sum_i \sum_j \omega(e_1^i, e_2^j)\pi(e_1^i, e_2^j),$$

the terms $\pi(e_1{}^i,e_2{}^j)$ are the first subtractions, weighted by their multiplicities $\omega(e_1{}^i,e_2{}^j)$, the terms $\pi(v_1{}^i,t_2{}^j)$ are the second subtractions, weighted by their multiplicities $\omega(v_1{}^i, t_2{}^j)$, and the terms $\pi(t_1{}^i,v_2{}^j)$ are the third subtractions, weighted by their multiplicities $\omega(t_1{}^i,v_2{}^j)$.

The computing of the boundary as the polyhedral cycle may include for each first subtraction, computing the multiplicity of the subtraction, and then computing the multiplicities of the second subtractions and third subtractions by propagating the computed multiplicities of the first subtractions (i.e., successively deducing the first and second subtractions from the first subtractions). The propagation is based on the property that the boundary of a polyhedral cycle is zero. In other words, the propagation uses the computed multiplicities of the first subtractions and the well-known property that the boundary of a polyhedral cycle is zero to deduce the second and third subtractions from the computed first subtractions.

The computation of the first subtractions may be done by executing a first algorithm which is referred to as "Algorithm 1" and which is now discussed. Algorithm 1 computes the terms of the type $\omega(e_1{}^i,e_2{}^j)$ of the previously discussed sum forming the polyhedral cycle. Algorithm 1, as the other Algorithms 2 to 7 discussed hereinbelow, is discussed for the case where the faces are triangle faces but can be extended to more general faces.

Algorithm 1 uses the function Side defined as follows:

$$\text{Side}(A, B, C, D) = \begin{cases} 1 & \text{if } \det(\vec{AB}, \vec{AC}, \vec{AD}) > 0 \\ -1 & \text{if } \det(\vec{AB}, \vec{AC}, \vec{AD}) < 0 \end{cases}.$$

Algorithm 1 computes the multiplicity $\omega(e_1{}^i,e_2{}^j)$ of any first subtraction $\pi(e_1{}^i,e_2{}^j)$. For simplification, the edges $e_1{}^i$ and $e_2{}^j$ are noted $e_1$ and $e_2$. The orientations of the edges $e_1$ and $e_2$ are irrelevant in Algorithm 1. Indeed, a change in orientation of $e_1$ implies a change of sign of the multiplicity. So, the weighted triangle in the polyhedral cycle would be the same:

$$\omega(e_1{}^T,e_2)\pi(e_1{}^T,e_2)=(-\omega(e_1,e_2))(-\pi(e_1,e_2))$$

where $e_1{}^T$ represents the edge $e_1$ reversed. With the notations of Algorithm 1, $$\pi(e_1,e_2)=(A_2-A_1,A_2-B_1,B_2-B_1)+(B_2-A_1,B_2-A_1,A_2-A_1).$$

Algorithm 1 is as follows:

---
Algorithm 1: Edge edge multiplicity
---
Input: $e_1 = (A_1, B_1)$, $e_2 = (A_2, B_2)$
// $S_1$ is a 2-manifold, so edge $e_1$ is shared by exactly
  two triangles
$(A_1, B_1, C) \in S_1$ and $(A_1, B_1, D) \in S_1$
$\delta_C :=$ Side $(-A_1 + A_2, -B_1 + A_2, -B_1 + B_2, A_2, - C)$
$\delta_D :=$ Side $(-A_1 + A_2, -B_1 + A_2, -B_1 + B_2, A_2, - D)$
if $\delta_C \neq \delta_D$ then
| return 0
end
sum := $-\delta_C$
forall $(A_2, B_2, E) \in S_2$ do
| $\delta_E :=$ Side $(-A_1 + A_2, -B_1 + A_2, -B_1 + B_2, -A_1, + E)$
| if $e_1$ is convex then if
|  | $\delta_E \neq \delta_C$ then
|  |  | sum := sum $- \delta_E$
|  | end
| else
|  | if $\delta_E = \delta_C$ then ---
Algorithm 1: Edge edge multiplicity
---
|  |  | sum := sum $+ \delta_E$
|  | end
| end
end
return sum If the second mesh is open, and thus has boundaries, the propagation may include propagating the computed multiplicities of the first subtractions from first subtractions involving boundary edges (i.e., starting from the first subtractions involving boundary edges, i.e., at least one edge involved in such subtraction is a boundary edge). The propagation may include using any multiplicity change function to propagate the multiplicities. For example, propagating a given multiplicity of subtraction may comprise assigning to the multiplicity of a neighboring subtraction (e.g., sharing a vertex with the given subtraction) the sum of the value of the given multiplicity and of the multiplicity change between the subtractions, and the method may iterate such assignments. For that, the method may execute Algorithm 3 below and a modification thereof where the roles of $S_2$ and $S_1$ are switched. Algorithm 3 computes the multiplicity $\omega(v_1,t_2)$ of any second subtraction $\pi(v_1,t_2)$. Algorithm 3 uses the following Algorithm 2 for computing multiplicities changes:

---
Algorithm 2: Compute multiplicities change
---
Input: $v_1$, $v_2$
// Iterate over neighbor vertices of $v_1$ in $S_1$
res := 0
forall $v'_1 \in$ Neighbors($v_1$) do
| res := res + $w((v_1, v'_1), e_2)$
end
return res Algorithm 3 is as follows:

---
Algorithm 3: Vertex triangle multiplicities
---
Input: $S_1$, $S_2$, w($e_1$, $e_2$)
// We iterate over vertices of $S_1$ to compute
  multiplicities of $(v_1, t_2)$, for all triangles of $S_2$
forall $v_1 \in S_1$ do
| Select an edge $e_2$ on the boundary of $S_2$ and its unique triangle
| $t_2$
| // Edge $e_2$ has the same orientation as in the triangle
| w($v_1$, $t_2$) := ComputeMultiplicityChange ($v_1$, $e_2$)
| // Initialize stack and set
| stack := [$t_2$]
| visited := {$t_2$}
| while stack $\neq \emptyset$ do
|  | $t_2$ = stack.pop( )
|  | forall ($e_2$, $t'_2$) $\in$ Neighbors($t_2$) do
|  |  | // $e_2$ is the common edge to $t_2$ and $t'_2$
|  |  | if $t'_2 \in$ visited then
|  |  |  | continue
|  |  | end
|  |  | // Edge $e_2$ has the same orientation as in the
|  |  |   triangle $t'_2$
|  |  | w($v_1$, $t'_2$) := w($v_1$, $t_2$) + ComputeMultiplicityChange
|  |  |   ($v_1$, $e_2$)
|  |  | stack.push($t'_2$)
|  |  | visited := visited $\cup$ {$t'_2$}
|  | end
| end
end For computing the multiplicity $\omega(t_1,v_2)$ of any third subtraction $\pi(t_1,v_2)$ (in the currently-discussed case of an open second mesh), the method may use a similar algorithm than algorithm 3, which is algorithm 3 but with the roles of $S_2$ and $S_1$ switched and with a modified version of the multiplicity change algorithm (Algorithm 2). The modified version is the following Algorithm 4:

---
Algorithm 4: Compute maltiplicities change
---
Input: $e_1$, $v_2$
// Iterate over neighbor vertices of $v_2$ in $S_2$
res := 0
forall $v'_2 \in$ Neightbors($v_2$) do
 | res := res − w($e_1$, ($v_2$, $v'_2$))
end
return res

---

Alternatively, if the second mesh is closed, the propagation may include, for each second or third subtraction:
  computing a first multiplicity value of the subtraction and a second multiplicity value of the subtraction, the second multiplicity value being the absolute value of the first multiplicity value; and
  computing the multiplicity of the subtraction as a mean of the first multiplicity value and of the second multiplicity value.
In this alternative, the computing of the first multiplicity value and the second multiplicity value may comprise:
  providing an initial value for the first multiplicity value;
  providing a corrective term that equals zero;
  for each respective face having an edge in common with the face involved in said each second or third subtraction (i.e., the face that said each second or third subtraction either subtracts to a vertex or from which said each second or third subtraction subtracts a vertex):
    propagating, using computed multiplicities of first subtractions, the first multiplicity value and the second multiplicity value to the corresponding subtraction that involves said respective face and the vertex involved in said second or third subtraction (the vertex that said corresponding subtraction either subtracts to said involved face or from which said each second or third subtraction subtracts said involved face). The propagation may include assigning to said corresponding subtraction's multiplicity the sum of the value of the multiplicity for said second or third subtraction and of the corrective term, the multiplicity being the mean of the first and second multiplicity values; and
    updating the corrective term if a difference between the first multiplicity value for said corresponding subtraction and the corrective term (e.g., the subtraction of the first multiplicity value by the corrective term) is larger than the second multiplicity value for said corresponding subtraction, the updating including attributing to the corrective term a value of a difference between the first multiplicity value for said corresponding subtraction and the second multiplicity value for said corresponding subtraction (e.g., the subtraction of the first multiplicity value by the second multiplicity value); and
  subtracting the corrective term from the initial value of the first multiplicity.

The providing of the initial multiplicity value may comprise computing the initial multiplicity value. For that, the method may execute the following Algorithm 5:

---
Algorithm 5: Compute initial multiplicity
---
Input: $v_1$, $t_2 = (v_2, v'_2, v''_2)$, $S_1$, $S_2$
res := 1
// Iterate over neighbor vertices of $v_1$ in $S_1$
forall $v'_1 \in$ Neighbors($v_1$) do
 | $s_{v'_1}$ := Side $(-v_1 + v_2, -v_1 + v'_2, -v_1 + v''_2, -v_1 - v'_1)$
 | if $s_{v'_1} = 1$ then
 | | res := res − 1
 | end
end
// Iterate over neighbor triangles of $v_1$ in $S_1$
res := 0
forall $(v_1, v'_1, v''_1) \in$ Neighbors($v_1$) do
 | $s_{v'_1}$ = Side $(-v_1 + v_2, -v_1 + v'_2, -v_1 + v''_2, -v_1 -v'_1)$
 | $s_{v'_1}$ = Side $(-v_1 + v_2, -v_1 + v'_2, -v_1 + v''_2, -v_1 -v''_1)$
 | if $s_{v'_1} = 1$ and if $s_{v'_1} = 1$ then
 | | res := res + 1
 | end
end
return res

---

Then the propagation may include, in this alternative where the second mesh is closed, executing Algorithms 6 and 7 below for computing the computing of the first multiplicity value and the second multiplicity value. For computing the first multiplicity value (denoted $\omega_2$) and the second multiplicity value (denoted $\omega_1$) for each second subtraction $\pi(t_1,v_2)$, the method may execute Algorithm 6, which is the following:

---
Algorithm 6: Vertex triangle multiplitities
---
Input: $S_1$, $S_2$, $w_1(e_2, e_2)$, $w_2(e_2, e_2)$
// We iterate over vertices of $S_1$ to compute
  multiplicities of ($v_1$, $t_2$) for all triangles of $S_2$
forall $v_1 \in S_1$ do
 | Select a triangle $t_2$ in $S_2$
 | $w_2(v_1, t_2)$ := ComputeInitialMultiplicity ($v_1$, $t_2$, $S_1$, $S_2$)
 | $w_1(v_1, t_2)$ := $|w_2(v_1, t_2)|$
 | // $\delta$ is a corrective term updated during propagation
 | $\delta$ := 0
 | // Initialize stack and set
 | stack := [$t_2$]
 | visited := $\{t_2\}$
 | while stack $\neq \emptyset$ do
 | | $t_2$ = stack.pop( )
 | | forall $(e_2, t'_2) \in$ Neighbors($t_2$) do
 | | | // $e_2$ is the common edge to $t_2$ and $t'_2$
 | | | if $t'_2 \in$ visited then
 | | | | continue
 | | | end
 | | | // Edge $e_2$ has the same orientation as in the
 | | |     triangle $t'_2$
 | | | $w(v_1, t'_2)$ := $w(v_1, t_2)$ + ComputeMultiplicityChange
 | | |   ($v_1$, $e_2$)
 | | | // Update $\delta$
 | | | if $w_1(v_1, t'_2) - \delta > |w_2(v_1, t'_2)|$ then
 | | | | $\delta$ := $w_1(v_1, t'_2) - |w_2(v_1, t'_2)|$
 | | | end
 | | | stack.push($t'_2$)
 | | | visited := visited $\cup \{t'_2\}$
 | | end
 | end
 | // Apply corrective term
 | forall $t_2 \in S_2$ do
 | | $w_1(v_1, t'_2)$ := $w_1(v_1, t'_2) - \delta$
 | end
end

---

For computing the first multiplicity value (denoted $\omega_2$) and the second multiplicity value (denoted $\omega_1$) for each third subtraction $\pi(t_1,v_2)$, the method may execute Algorithm 7, which is the following:

---
Algorithm 7: Triangle vertex multiplitities
---
Input: $S_1$, $S_2$, $w_1(e_1, e_2)$, $w_2(e_1, e_2)$
// We iterate over vertices of $S_2$ to compute
    multiplicities of $(t_1, v_2)$ for all triangles of $S_1$
forall $v_2 \in S_2$ do
| Select a triangle $t_1$ in $S_1$
| $w_1(t_1, v_2) :=$ ComputeInitialMultiplicity $(v_2, t_1, S_2, S_1)$
| $w_2(t_1, v_2) := |w_1(t_1, v_2)|$
| // $\delta$ is a corrective term updated during propagation
| $\delta := 0$
| // Initialize stack and set
| stack $:= [t_1]$
| visited $:= [t_1]$
| while stack $/= \emptyset$ do
| | $t_1 =$ stack.pop( )
| | forall $(e_1, t'_1) \in$ Neighbors$(t_1)$ do
| | | // $e_1$ is the common edge to $t_1$ and $t'_1$
| | | if $t'_1 \in$ visited then
| | | | continue
| | | end
| | | // Edge $e_1$ has an orientation opposite to the
| | | orientation of triangle $t'_1$
| | | $w(t'_1, v_2) := w(t_1, v_2) +$ ComputeMultiplicityChange
| | | $(v_2, e_1)$
| | | // Update $\delta$
| | | if $w_2(t'_1, v_2) - \delta > |w_1(t'_1, v_2)|$ then
| | | | $\delta := w_2(t'_1, v_2) - |w_1(t'_1, v_2)|$
| | | end
| | | stack.push($t'_1$)
| | | visited $:=$ visited $\cup \{t'_1\}$
| | end
| end
| // Apply corrective term
| forall $t_1 \in S_1$ do
| | $w_2(t_1, v_2) := w_2(t_1, v_2) - \delta$
| end
end

---

After executing Algorithm 7, the method comprises multiplying $\omega_1(t_1,v_2)$ and $\omega_2(t_1,v_2)$ by $-1$.

Then, further to the execution of Algorithms 6 and 7, the method may obtain the multiplicities co for the second and third subtractions by computing them as $$\omega = \frac{\omega_1 + \omega_2}{2}.$$

In alternative implementations, the method may consider the case where the function $\pi$ is the Minkowski sum instead of the Minkowski subtraction, and where the formula for $\pi(e_1,e_2)$ is $$\pi(e_1,e_2)=(A_2+A_1,A_2+B_1,B_2+B_1)+(B_2+A_1,B_2+A_1,A_2+A_1).$$

In these alternative implementations, the method may comprise first applying a central symmetry centered at the origin to the first mesh $S_1$ representing the head of the machining tool, which allows to return to the case of a Minkowski sum of $V_1$ and $S_2$. Then the method may in these implementations comprise, for computing the multiplicities:

applying a modified version of Algorithm 1, with $A_1$, $B_1$ C and D changed by their symmetric points, i.e., $-A_1$, $-B_1$ $-C$ and $-D$, respectively, optionally after a filtering using a gaussian map as discussed hereinbelow;
if $S_2$ is closed:

selecting any triangle and apply a modified version of algorithm 5, with $v_1$, $v_1'$ and $v_1''$ changed by their symmetric points, i.e., $-v_1$, $-v_1'$ and $-v_1''$, respectively;

propagate the multiplicities by applying algorithm 6 and a modified version of algorithm 7, where "Edge $e_1$ has an orientation opposite to the orientation of triangle $t_1'''$" is replaced by "edge $e_1$ has the same orientation as in the triangle $t_1'''$", and where there is no multiplication of $\omega_1(t_1,v_2)$ and $\omega_2(t_1,v_2)$ by $-1$ after executing algorithm 7;

computing the mean of the $\omega_1$ and $\omega_2$ (for each $(\omega_1,\omega_2)$) as discussed above;

if $S_2$ is open, selecting a boundary triangle and applying algorithm 3 (using algorithm 2 or 4 as previously discussed) to propagate the multiplicity from the boundary.

Figure 4:
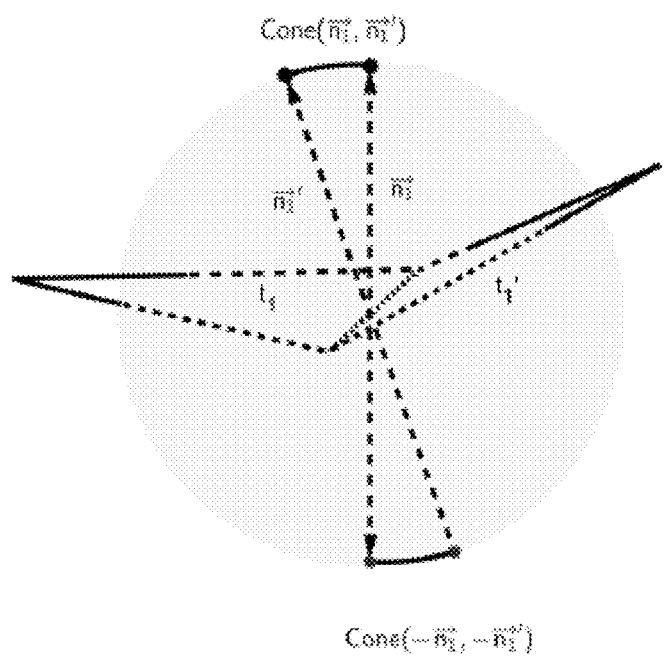

The method may comprise, prior to the computing of the multiplicities for the first subtractions, filtering the first subtractions having a zero multiplicity by using a gaussian map. Indeed, some multiplicities equal zero. Filtering them allows to save computations for computing the multiplicities for the first subtractions, and thus to save computing resources. In this case, $S_2$ is a manifold at the neighbourhood of each edge $e_2$, although $S_2$ may or may not be globally manifold. The gaussian map optimization may in examples consider, for each edge $e_i$, the normal units $\vec{n_i}$, $\vec{n_i}'$ of their two neighboring triangles and the arcs on the great circle passing through two points on the sphere $S^2$ defined by these unit vectors and their opposites. The two arcs for edge $e_1$ are represented on FIG. 4. If Cone$(\vec{n_1},\vec{n_1}')\cup$Cone$(-\vec{n_1},-\vec{n_1}')$ and Cone$(\vec{n_2},\vec{n_2}')\cup$Cone$(-\vec{n_2},-\vec{n_2}')$ are disjoint, the multiplicity of the pair is zero.

The method further comprises determining a path of the machining tool for 3D axis machining of the machined part based on the determined boundary. The determined path may be a z-level machining path determined from the determined boundary, in which case the path may be used in a z-level 3D axis machining process. For example, the 3D axis machining process previously-discussed and that may comprise the method may machine the part according to a z-level 3D axis machining process using a z-level machining path determined by the method. Determining a path of the machining tool based on the determined boundary may be carried out by any suitable method known in machining design. The path may directly correspond to the determined boundary of the Minkowski subtraction and the method may thus determine (e.g., parametrize) the path directly from the boundary. Alternatively, the method may determine the path of the machining tool by post-processing the determined boundary.

An example process of determining the path of the machining tool by post-processing the determined boundary is now discussed, and the process may be included in the method so that determining the path of the machining tool by post-processing the determined boundary includes performing the process.

Figure 5:
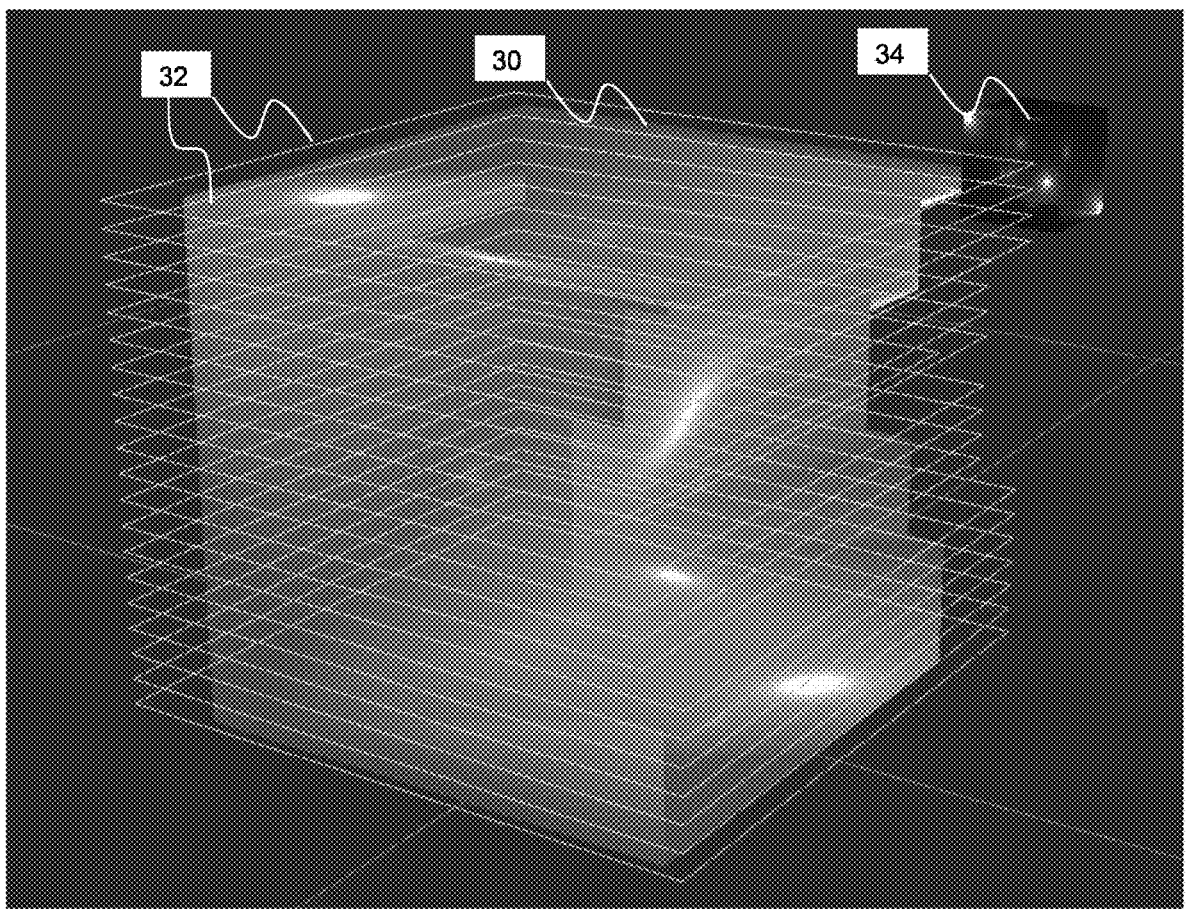

The process takes as input a polyhedral cycle of dimension 2 of $\mathbb{R}^3$ (e.g., the polyhedral cycle computed by the method), the polyhedral cycle representing the Minkowski subtraction W−T of a mesh representing a workpiece W (i.e., a machined part) by a volume delimited by a mesh representing the head of a 3D axis machining tool T. The polyhedral cycle is the boundary of the polyhedral chain $p(x)=\chi(\pi^{-1}(x))$ where $\pi:W\times T\to \mathbb{R}^3$, $(w,t)\to w-t$ and where χ is the Euler characteristic. The process computes a path of the tool for a z-level machining scenario where the machining is done through successive machining paths on planes with z normal, i.e., the machining tool is successively applied by following the successive paths, as illustrated on FIG. 5. As shown on FIG. 5, workpiece 30 is machined by successively moving the head 34 of the machining tool on the successive paths 32 (only two of which being references in FIG. 5, for simplicity).

The process considers such a plane P (with z normal) and the restrictions of the functions p and ∂p on this plane. $\partial p_{|P}$ is still a boundary of the function $p_{|P}$. The function $p_{|P}$ can be seen as the winding numbers of the set of curves which form the support of function $\partial p_{|P}$. The function $\partial p_p$ is defined by a weighted sum of edges: the intersection edges between the plane and triangles of the ∂p sum. The process is carried out under the hypothesis that no triangles are on the plane and that there are no degenerate intersections. If this hypothesis is not satisfied before executing the process, the method may execute a simulation of simplicity method to enforce the hypothesis. The edges inherit the orientations from the triangles. Reversing edge orientation is equivalent to changing the sign of its weight/multiplicity (as reversing the triangle normal is).

The process comprises solving the intersections between the edges supports of the cycle (i.e., solving the auto-intersections of the polyhedral cycle), which is equivalent to rewrite $\Sigma_i \omega_i e_i$ as $\Sigma_j \omega_j' e_j'$ (e.g., the process may implement this rewriting) with the following properties:

$\forall j, \exists i, |e_j'| \subset |e_i|$ $\forall j \neq k, |e_j'| \cap |e_k'|$ is a vertex or $\emptyset$ $\Sigma_j \omega_j' e_j' \neq \Sigma_i \omega_i e_i$ on a finite set of vertices.

Figure 6:
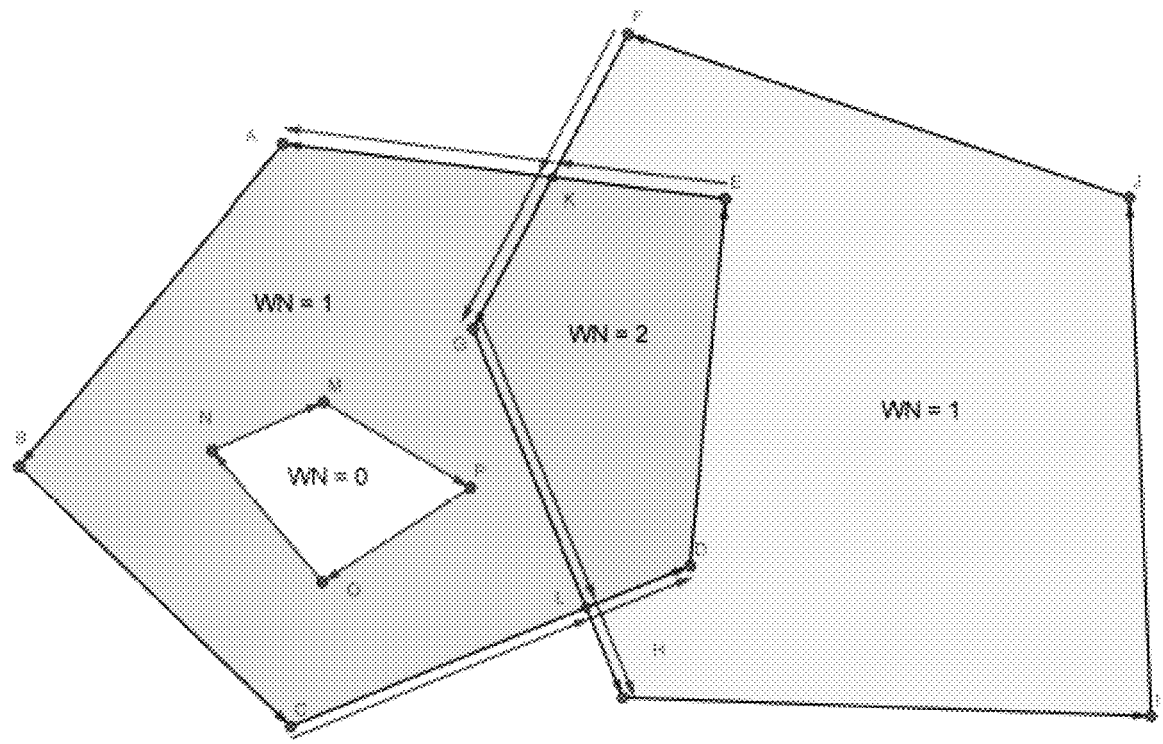

FIG. 6 illustrates the resolution of the intersections: intersections points L and L are created, and [AE], [FG], [CD], [GH] are split. The new cycle is still a boundary of $p_{|P}$ since they are equal everywhere except on a finite set of points.

The process comprises then constructing the intersection of the plane P with the Minkowski subtraction W−T. The construction is based on the consideration that the connected components of the set $P \backslash U_j e_j'$ are the faces of the Minkowski subtraction. The function $p_{|P}$ is constant on the faces. On FIG. 6, there are five faces: two with winding number (WN) 1, one with winding number 2, and two with winding number 0 (the exterior and the interior). The faces with a non-zero winding number are inside the Minkowski subtraction since the winding number of a face is $\chi(\pi^{-1}(x))$ and $\chi(\emptyset)=0$. But one may have $\chi(\pi^{-1}(x))=0$ and $\pi^{-1}(x) \neq \emptyset$. The process may comprise deciding whether faces with a zero winding number are inside or outside the Minkowski subtraction by performing one or more of the following tests:
- detecting, based on logical criteria, that one or more bars on the boundaries of the face cannot belong to the Minkowski subtraction boundary. For example, a bar issued from a edge/edge face cannot be on the boundary is any of the two edges is on a concavity. Similarly, a bar issued from a vertex/triangle face cannot be on the boundary of the cone of the vertex is concave or if the face multiplicity is negative,
- testing whether a point M inside the face belongs to the Minkowski subtraction W−T, which is equivalent to test if the meshes subtraction W and subtraction T+M intersect.

Figure 7:
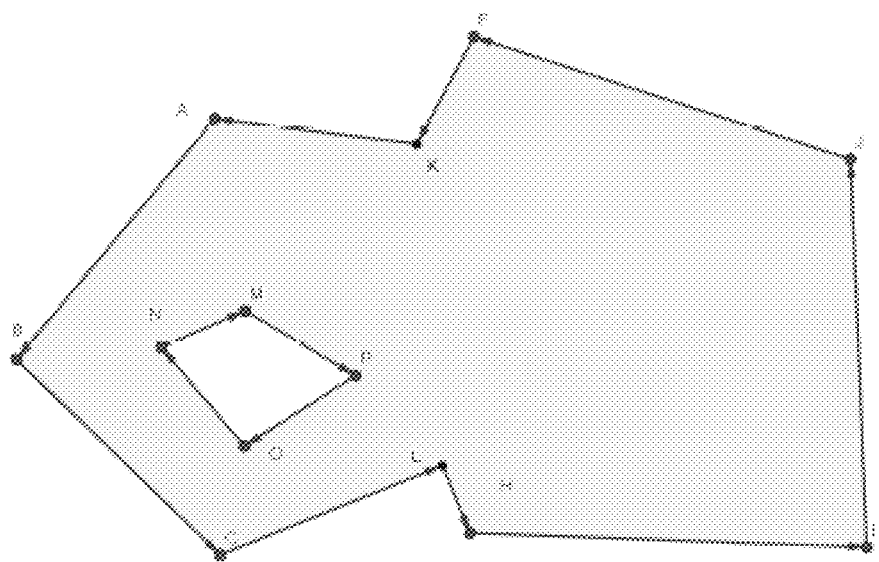

The process may then, once having detected which faces belong to the intersection W−T ∩P, performing their union and extract their boundary loops, as illustrated on FIG. 7.

The method may, instead of the previously-discussed process, performing another process to determine the path of the machining tool and which solves the auto-intersections between the triangles of the polyhedral cycle and then build the external envelop of the Minkowski subtraction. This alternative process intersects the envelop by the planes and extracts the contours.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 8:
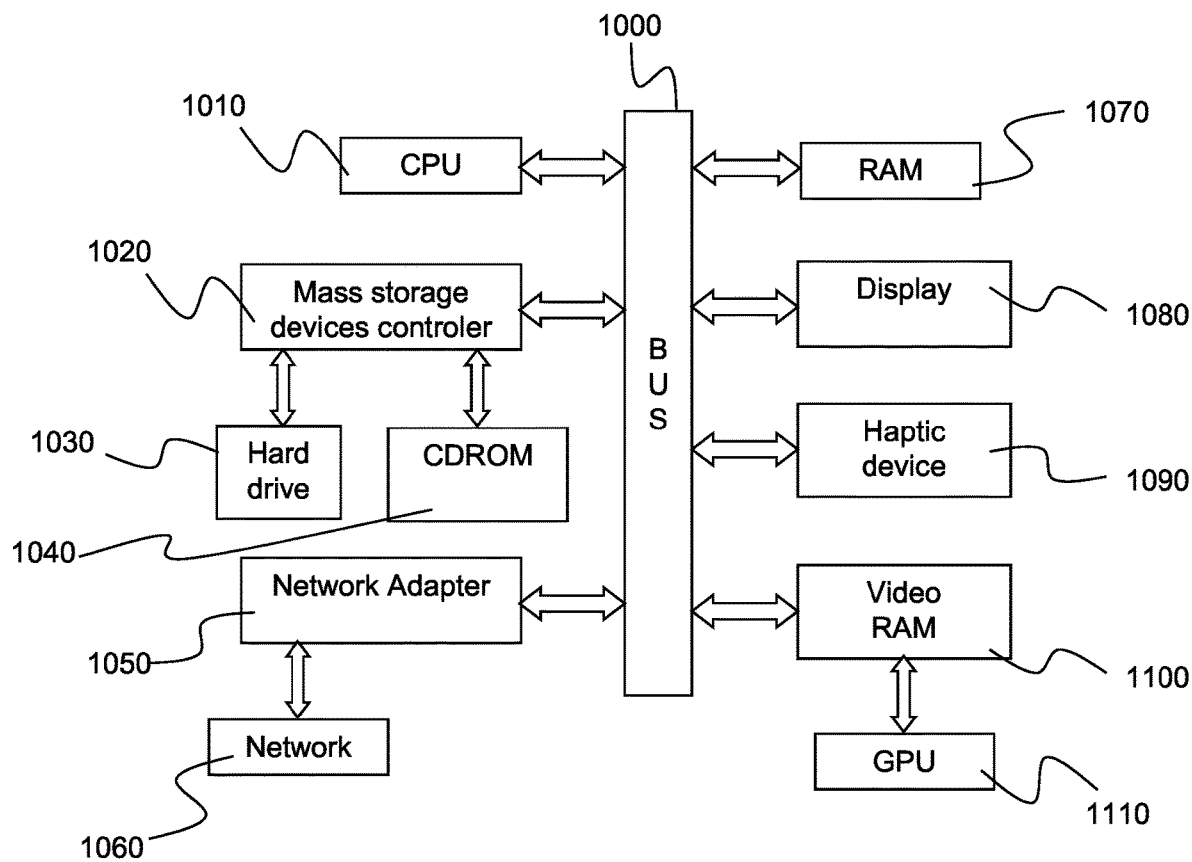
FIG. 8 shows an example of the system.

FIG. 8 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for 3D axis machining design, the method comprising:
   obtaining a first mesh representing a head of a machining tool and a second mesh representing a machined part, the first mesh being closed;
   determining a boundary of a Minkowski subtraction of a surface represented by the second mesh by a volume delimited by the first mesh, the determining of the boundary including computing the boundary as a polyhedral cycle by computing, for each element of the boundary, a multiplicity of the element in the polyhedral cycle; and
   determining a path of the machining tool for 3D axis machining of the machined part based on the determined boundary,
   wherein the method further comprises outputting the determined path as computer data usable to control and/or configure the machining tool to machine the part.

2. The computer-implemented method of claim 1, wherein the first mesh is a surface mesh and the second mesh is a surface mesh.

3. The computer-implemented method of claim 2, wherein the first mesh is a triangle surface mesh and the second mesh is a triangle surface mesh.

4. The computer-implemented method of claim 2, wherein the polyhedral cycle is a sum of elements of the Minkowski subtraction, the elements in the sum including:
   first subtractions each of an edge of the second mesh by an edge of the first mesh;
   second subtractions each of a vertex of the second mesh by a face of the first mesh;
   third subtractions each of a face of the second mesh by a vertex of the first mesh,
   each element in the sum being weighted by its determined multiplicity.

5. The computer-implemented method of claim 4, wherein the computing of the boundary as the polyhedral cycle includes:
   for each first subtraction, computing the multiplicity of the subtraction; and
   computing the multiplicities of second subtractions and third subtractions by propagating the computed multiplicities of the first subtractions, the propagation being based on a property that the boundary of a polyhedral cycle is zero.

6. The computer-implemented method of claim 5, wherein,
   if the second mesh is open, the propagation includes propagating the computed multiplicities of the first subtractions from first subtractions involving boundary edges; and/or
   if the second mesh is closed, the propagation includes, for each second or third subtraction:
      computing a first multiplicity value of the subtraction and a second multiplicity value of the subtraction, the second multiplicity value being the absolute value of the first multiplicity value; and
      computing the multiplicity of the subtraction as a mean of the first multiplicity value and of the second multiplicity value.

7. The computer-implemented method of claim 6, wherein the computing of the first multiplicity value and the second multiplicity value comprises:
   obtaining an initial value for the first multiplicity value;
   obtaining a corrective term that equals zero;
   for each respective face having an edge in common with the face involved in said each second or third subtraction:
      propagating, using computed multiplicities of first subtractions, the first multiplicity value and the second multiplicity value to the corresponding subtraction that involves said respective face and the vertex involved in said second or third subtraction; and
      updating the corrective term if a difference between the first multiplicity value for said corresponding subtraction and the corrective term is larger than the second multiplicity value for said corresponding subtraction, the updating including attributing to the corrective term a value of a difference between the first multiplicity value for said corresponding subtraction and the second multiplicity value for said corresponding subtraction; and
   subtracting the corrective term from the initial value of the first multiplicity.

8. The computer-implemented method of claim 5, wherein the method further comprises, prior to the computing of the multiplicities for the first subtractions, filtering the first subtractions having a zero multiplicity by using a gaussian map.

9. The computer-implemented method of claim 2, wherein the polyhedral cycle is of a type:

$$\sum_i \sum_j \omega(v_1^i, t_2^j) \pi(v_1^i, t_2^j) + \sum_i \sum_j \omega(t_1^i, v_2^j) \pi(t_1^i, v_2^j) + \sum_i \sum_j \omega(e_1^i, e_2^j) \pi(e_1^i, e_2^j),$$

where $\pi: V_1 \times S_2 \to \mathbb{R}^3$ $(x_1, x_2) \to x_2 - x_1'$ and where:
   $S_2$ is the second mesh and $V_1$ is the volume delimited by the first mesh,
   an image of $\pi$ is the Minkowski subtraction of $S_2$ by $V_1$,
   the elements are sum over subtractions $\pi(v_1,t_2)$, $\pi(t_1,v_2)$ and $\pi(e_1,e_2)$ where v, e and t are respectively the vertices, the edges and the faces of the meshes.

10. The computer-implemented method of claim 9, wherein the polyhedral cycle is a boundary of the polyhedral chain $$p(x)=\chi(\pi^{-1}(x)),$$

where $\chi$ is a Euler characteristic.

11. The computer-implemented method of claim 1, wherein the first mesh is non-convex and/or the second mesh is non-convex.

12. A non-transitory computer-readable data storage medium having recorded thereon a computer program having instructions for performing a method for 3D axis machining design, the method comprising:

obtaining a first mesh representing a head of a machining tool and a second mesh representing a machined part, the first mesh being closed;

determining a boundary of a Minkowski subtraction of a surface represented by the second mesh by a volume delimited by the first mesh, the determining of the boundary including computing the boundary as a polyhedral cycle by computing, for each element of the boundary, a multiplicity of the element in the polyhedral cycle; and determining a path of the machining tool for 3D axis machining of the machined part based on the determined boundary, wherein the method further comprises outputting the determined path as computer data usable to control and/or configure the machining tool to machine the part.

13. The non-transitory computer-readable data storage medium of claim 12, wherein the first mesh is a surface mesh and the second mesh is a surface mesh.

14. The non-transitory computer-readable data storage medium of claim 13, wherein the first mesh is a triangle surface mesh and the second mesh is a triangle surface mesh.

15. The non-transitory computer-readable data storage medium of claim 13, wherein the polyhedral cycle is a sum of elements of the Minkowski subtraction, the elements in the sum including:

first subtractions each of an edge of the second mesh by an edge of the first mesh;

second subtractions each of a vertex of the second mesh by a face of the first mesh; and third subtractions each of a face of the second mesh by a vertex of the first mesh, each element in the sum being weighted by its determined multiplicity.

16. The non-transitory computer-readable data storage medium of claim 15, wherein the computing of the boundary as the polyhedral cycle includes:

for each first subtraction, computing the multiplicity of the subtraction; and computing the multiplicities of the second subtractions and third subtractions by propagating the computed multiplicities of the first subtractions, the propagation being based on a property that the boundary of a polyhedral cycle is zero.

17. A computer system comprising:

a processor coupled to a memory, the memory having recorded thereon a computer program comprising instructions for 3D axis machining design that when executed by the processor causes the processor to be configured to:

obtain a first mesh representing a head of a machining tool and a second mesh representing a machined part, the first mesh being closed, determine a boundary of a Minkowski subtraction of a surface represented by the second mesh by a volume delimited by the first mesh, the determining of the boundary including computing the boundary as a polyhedral cycle by computing, for each element of the boundary, a multiplicity of the element in the polyhedral cycle, and determine a path of the machining tool for 3D axis machining of the machined part based on the determined boundary, wherein the processor to be configured to output the determined path as computer data usable to control and/or configure the machining tool to machine the part.

18. The computer system of claim 17, wherein the first mesh is a surface mesh and the second mesh is a surface mesh.

19. The computer system of claim 18, wherein the first mesh is a triangle surface mesh and the second mesh is a triangle surface mesh.

20. The computer system of claim 18, wherein the polyhedral cycle is a sum of elements of the Minkowski subtraction, the elements in the sum including:

first subtractions each of an edge of the second mesh by an edge of the first mesh;

second subtractions each of a vertex of the second mesh by a face of the first mesh; and third subtractions each of a face of the second mesh by a vertex of the first mesh, each element in the sum being weighted by its determined multiplicity.

* * * * *